United States Patent Office 2,801,210
Patented July 30, 1957

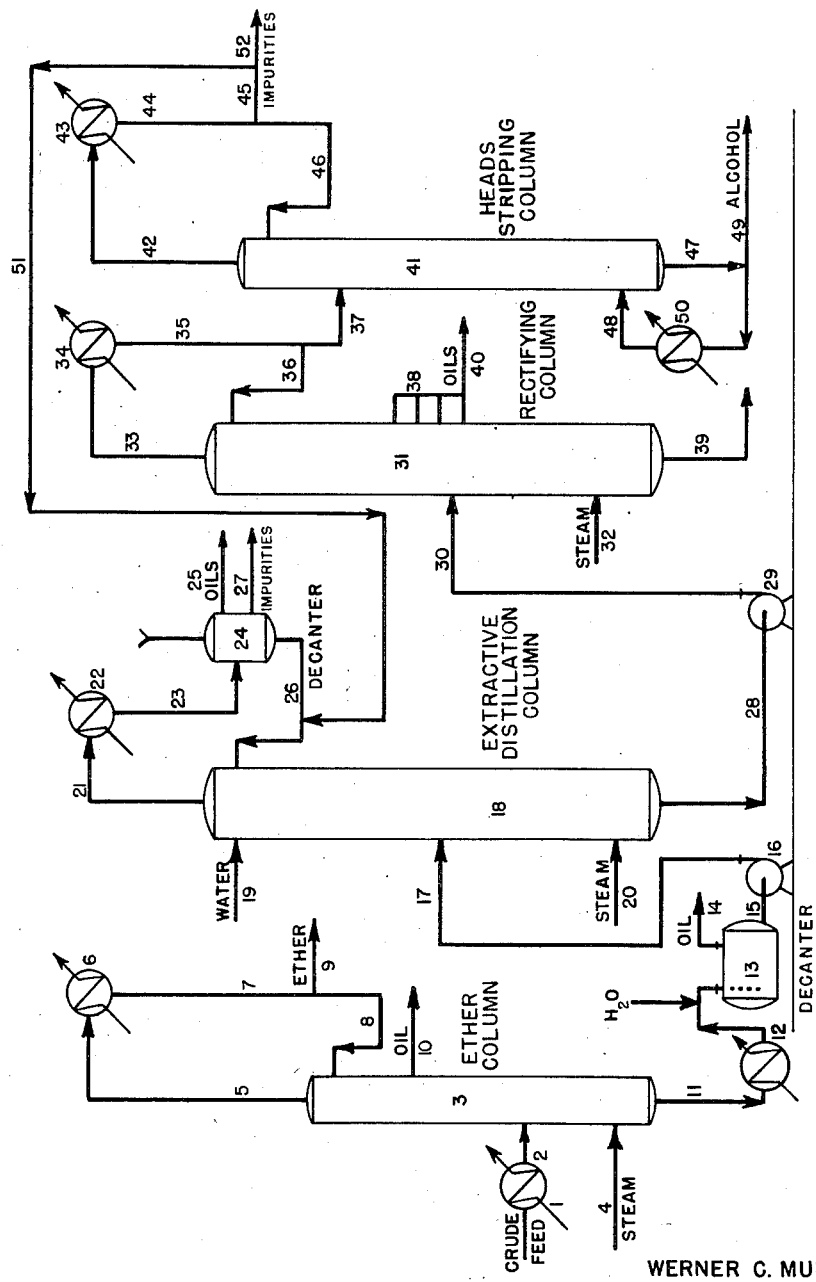
WERNER C. MULLER
FRANKLYN D. MILLER
JOHN J. HAWKINS
*INVENTOR.*
BY

2,801,210
EXTRACTIVE DISTILLATION PROCESS FOR THE PURIFICATION OF ETHANOL

Werner C. Muller, Roslyn, N. Y., Franklyn D. Miller, Cincinnati, Ohio, and John J. Hawkins, Champaign, Ill., assignors to National Petro-Chemicals Corporation, New York, N. Y., a corporation of Delaware Application November 16, 1954, Serial No. 469,206

2 Claims. (Cl. 202—39.5)

This invention relates generally to a novel, commercial process for the refining and purification of crude aliphatic alcohols produced by the hydration of mono-olefins. More specifically, this invention relates to a process whereby an impure alcohol produced by the hydration of mono-olefins is conveniently processed to remove in one integrated operation, impurities boiling below the boiling point of the alcohol being purified, impurities boiling in the same range as the alcohol, and impurities boiling considerably above the alcohol. The process is of special importance since it completely removes both lower and higher boiling malodorous impurities.

This invention provides an effective process in which both water-soluble and water-insoluble impurities, including particularly odor-producing and potential odor-producing contaminants, are removed from alcohols produced by the hydration of olefins. The process of this invention is especially useful for the production of high quality, substantially odorless aliphatic alcohols, particularly ethanol.

The invention provides an improved process for purification of an impure ethanol containing stream, the ethanol having been made by hydration of ethylene, in which the ethanol containing stream, after appropriate rectification and refining steps, is subjected to a final rectification during which the residual minor amounts of lower boiling malodorous contaminants, more volatile than ethanol, are removed. The ethanol is recovered as a pure bottoms stream, free of impurities and malodorous materials.

Further and more specifically, this invention provides an improved process for the refining and purification of crude ethanol obtained by the catalyzed hydration of ethylene in which the total crude ethanol stream is treated to remove the diethyl ether, prior to water extractive distillation of the partially purified aqueous alcohol. Following these preliminary steps, the dilute aqueous alcohol is subjected to rectification during which residual, thermally unstable impurities undergo decomposition and degradation to produce malodorous products lower boiling than ethanol. According to this invention, the concentrated alcohol, containing minor amounts of these lower boiling contaminants, is then passed into a final rectification, or stripping tower, in which these voltatile contaminants are removed from the alcohol, which is then recovered as a pure bottoms stream. More specific details and features of the invention will become apparent from the description given below.

By the catalyzed hydration of olefins is meant those processes in which the mono-olefins are hydrated in the presence of a catalyst, including both the acid catalyzed processes wherein mono-olefins and mixtures thereof are hydrated in the presence of polybasic mineral acid-acting acids such as sulfuric acid, phosphoric acid, and benzenesulfonic acid, and those processes, of the direct hydration type, in which the olefin is hydrated in the presence of solid catalysts such as phosphoric acid, phosphoric acid-tungsten oxide and the like. The most common commercial process is one in which ethylene is absorbed in strong sulfuric acid to yield an absorbate containing monoethyl sulfate and diethyl sulfate esters. Said absorbate is diluted and hydrolyzed, and a crude aqueous ethanol mixture is separated therefrom.

Operating according to the process of this invention, excellent yields of highest quality purified alcohol can be produced for use in industries requiring odor-free solvents. These include extensive uses in the cosmetic, perfume, drug, biological and vitamin industries.

It is well known that alcohols produced by the above outlined methods, and especially those produced by the sulfuric acid hydration of olefins, possess to a more or less degree, a distinct and foreign odor, slightly penetrating and for the most part disagreeable. Although it is not intended to ascribe the disagreeable odor of these alcohols to the presence of any one or to any particular combination of chemical compounds, it is definitely known that the odors of the crude alcohols depend largely on the quality of the starting material, that is, the purity of the olefin stream employed in the olefin hydration operation. Likewise, the odor of a refined alcohol depends to a similar extent on the quality of the crude alcohol from which it is originally prepared. Thus, a rather wide range of variations in purity and odor characteristics is possible for synthetic ethanol products.

Olefin hydrocarbons, such as those produced by the cracking of mineral oils, fuel oils, kerosenes, petroleum residues, hydrocarbon gases, and the like, contain variable amounts of compounds having an obnoxious odor, particularly compounds containing chemically bound sulfur such as hydrogen sulfide, alkyl sulfides, mercaptans, etc. These materials, even when present as traces in the olefinic stream fed to the acid hydration process, contribute heavily to the obnoxious odor of the crude alcohol. Although pure elemental sulfur itself has no odor, when it is present in combination with other elements, it produces powerful odoriferous agents. The bad odor of alcohols has also been at least partially attributed to the presence of the so-called polymer products of wide boiling range which are formed by side reactions during the acid catalyzed olefin hydration process. The odor of these polymerized products is further accentuated by the presence of any sulfur compounds contained therein, although the odor of some pure polymers is, by itself, somewhat unpleasant. It has been further demonstrated that obnoxious odors in some hydration alcohols can be directly attributed to the decomposition of these polymeric materials during subsequent distillation operations. It is also possible that the presence of traces of nitrogen compounds contributes to the odor of the crude alcohols.

In order to show the number and diversity of the impurities usually present in alcohols produced by catalyzed hydration processes, the following analysis is presented. This analysis was made on a sample of crude ethanol produced by the sulfuric acid hydration of ethylene, the proportions given being based on an anhydrous alcohol basis.

| | Weight percent |
|---|---|
| Ethanol | 88.0 |
| Ether | 11.25 |
| Ketones | Trace |
| Hydrocarbons | 0.45 |
| Higher alcohols | Trace |
| Sulfur compounds _____ p. p. m. as sulfur__ | 3 |
| Polymer materials | 0.30 |

A typical ASTM standard distillation of a sample of the polymer materials fraction, resulting from the production of ethanol by the sulfuric acid hydration of ethylene, is as follows:

| | Temp., °F. |
|---|---|
| Initial boiling point | 211 |
| 5% | 412 |
| 10% | 419 |
| 20% | 428 |
| 30% | 435 |
| 40% | 441 |
| 50% | 450 |
| 60% | 459 |
| 70% | 469 |
| 80% | 490 |
| 90% | 512 |
| 95% | 545 |
| End Point recovery—96% | 558 |

Thus, regardless of exact causes, it has been found that the crude ethanol produced by the sulfuric acid hydration of ethylene contains malodorous impurities which are peculiar to products from the hydration process, including water, ethers, ketones, other higher alcohols, hydrocarbons, sulfur and nitrogen compounds, and various polymer oils having more or less complex chemical structures.

Until recently, commercial crude aqueous ethanol resulting from the acid hydration of ethylene was purified by the general method outlined below. The crude aqueous alcohol was diluted with additional water in an attempt to throw out of solution a portion of the water insoluble impurities. Any resulting layer of insoluble impurities was separated. The remaining aqueous alcohol was then subjected to a distillation in a rectification column, wherein some of the low boiling impurities, including the major porton of the ethers, and some of the light hydrocarbons were removed overhead. The aqueous alcohol bottoms fraction from this rectification column was sent to a second rectification column from which various fractions were removed either overhead or as side streams. For example, a cut containing heavy polymer oils, ethanol, and water was removed at a point somewhat below the feed plates; another cut containing lighter polymer oils, ethanol, and water was removed at a point above the feed plate; an overhead cut containing volatile impurities and polymer decomposition products was removed from the top of the tower, while the product alcohol itself was recovered as a side stream removed at a point a few plates from the top of the tower. This type of purification operation has been shown to give unsatisfactory alcohol. It consistently gives final ethanol fractions having bad odor characteristics of more or less intensity depending on the composition and properties of the starting alcohol fraction.

More recently, it has been further suggested that the crude aqueous alcohol mixture containing the impurities as described can be subjected to an improved operation in which the crude aqueous ethanol fraction is fed to a water extractive distillation tower at an intermediate point, and in which controlled amounts of water are fed to the top of the tower or at a point near the top in sufficient quantity to reduce the concentration of ethanol in the internal liquid reflux to 2 to 60 weight per cent. At these dilutions the volatility of the water insoluble impurities including ethers, ketones, higher alcohols, low molecular weight hydrocarbons, and the higher boiling polymer oils is enhanced somewhat thereby facilitating their removal.

Hydration of ethylene using sulfuric acid produces diethyl ether as a by-product in quantities of from 3 to 15 weight per cent based on the amount of ethanol produced. It has been found advantageous, although not necessary, to remove substantially all of this ether before the alcohol fraction is subjected to further treatment. In addition, the other above outlined impurities are present, particularly the malodorous polymer oils having relatively high boiling ranges up to 480–660° F. These higher boiling materials are difficult, if not impossible, to remove completely by extractive distillation even in the presence of large amounts of water and the most favorable operating conditions.

In a subsequent distillation operation, the dilute aqueous alcohol product recovered from conventional purifying and refining operations but containing residual odoriferous impurities described above, is then ordinarily taken to a concentrating or rectifying column, wherein the alcohol is concentrated and recovered as an overhead fraction. It has been further found that the relatively high boiling impurities including particularly the polymer oils when introduced into the rectifying column even in small amounts, undergo thermal degradation and decomposition yielding low boiling polymer oils, sulfur containing materials, and partially oxygenated organic compounds. These lighter fractions have lower molecular weights and/or boiling ranges since they generally consist of fragments of heavier fractions. Because of these characteristics, they are readily carried over into the alcohol overhead fraction and are thus present in the finished, refined alcohol. Such impure alcohol has an obviously unpleasant odor and purified alcohol of desired odor characteristics cannot be thus obtained as a fraction from the upper portion of the rectifying column.

A sample of a fraction of oil recovered as a side stream from a rectifying column was studied to determine its behavior on heating both alone and in the presence of alcohol and water under thermal conditions typical of those normally existing in the rectifying zone wherein concentration is effected. A sample of polymer oil containing 350 p. p. m. of sulfur was added to refined alcohol and refluxed in a laboratory distillation column (180–200° F. atm. pressure). A sample of alcohol drawn from the overhead shortly after refluxing was begun showed only a slight malodorous content. A sample of overhead drawn after 24 hours of refluxing was extremely malodorous and exhibited a sulfurous characteristic. The residual oil recovered from the charge was analyzed and showed only 285 p. p. m. of sulfur. This is clear evidence that substantial portions of the sulfur containing oil decomposed during the period of refluxing and that this decomposed, volatile material carried relatively large amounts of sulfur and malodorous impurities into the volatile overhead fraction.

A sample of polymer oil containing 350 p. p. m. of sulfur was distilled to dryness under vacuum (0.4 mm.) and yielded the following fractions at temperatures of from 175° to 225° F.:

| Fraction No. | Weight, gm. | Sulfur, p. p. m. |
|---|---|---|
| Cold trap | 2.6 | 722 |
| No. 1 | 6 | 210 |
| No. 2 | 12.8 | 154 |
| No. 3 | 14.3 | 144 |
| No. 4 | 4.2 | 526 |
| Residue | 1.6 | |

Thus the volatile decomposition product collected in a dry ice cold trap located on the condenser vent contained the greatest concentration of sulfur. Although appreciable concentrations of sulfur were found in all fractions, the greatest amount, 722 p. p. m. sulfur found in the cold trap represents volatile impurities produced by the thermal decomposition of the heavy sulfur containing polymer oils during the distillation. Such thermal decomposition causes the high sulfur content of the cold trap fraction, all of which is volatile and passes overhead with ethanol during distillation.

In purification processes for the treatment of impure ethanol produced by fermentation, it has been suggested that the impure ethanol product be subjected to a stripping distillation either initially or in conjunction with other purification treatments. However, such operations are used to remove volatile, lower boiling impurities which are originally present and are produced with the alcohol such as aldehydes and the like. In fermentation alcohol, the problem of thermally decomposable, malodorous materials is not serious. The use of a stripping column following rectification is in no way critical and is, in fact, unnecessary, since no appreciable amount of volatile impurities are later formed and no malodorous materials are thus produced.

According to the improvements comprising this invention, a crude aqueous alcohol mixture containing from 0.1 to 2.0% polymer oils, is used as the original feed stream. This synthetic ethanol stream is produced by the hydration of an ethylene containing stream with sulfuric acid. In addition, from 3 to 15% by weight of diethyl ether may be present, depending on whether or not the crude ethanol has previously been treated for removal of volatiles, including particularly, the diethyl ether. The crude alcohol mixture also contains varying amounts of water, for instance, from 12 to 60% by weight.

Preferably, the aqueous mixture is initially subjected to a fractional distillation in which the alcohol mixture is fed into a distillation tower of 30 to 60 plates at an intermediate point. The column is operated at a superatmospheric pressure of 5 to 20 p. s. i. g. to facilitate condensation of ether. The temperature within the column is controlled such that the temperature at the top of the column is between 120–140° F., and at the bottom, between 200 and 220° F. The vapor stream from the upper portion of this column has the approximate composition of 98 weight percent ether, 1.5 weight percent water, together with traces of acetaldehyde and other low boiling impurities. This overhead fraction is condensed, and at least a portion removed as crude diethyl ether for further purification. Some polymer oil impurities which are more volatile than aqueous ethanol may concentrate in the ether removal column at a point in the vicinity of the feed plate. These impurities are preferably removed from the column as a separate stream. This impurities stream constitutes a relatively small portion of the total odor producing material in the crude ethanol.

The crude aqueous alcohol stream containing the remaining impurities, but preferably substantially free of ether, is removed as a bottoms fraction and is then subjected to a water extractive distillation operation. If the ether has been removed, this bottoms stream may contain about 60% alcohol, 39.5% water, and 0.5% impurities, including malodorous materials. If the stream has not previously been subjected to distillation to remove ether, it may contain up to about 15% diethyl ether in addition to the above listed components.

Prior to the water extractive distillation operation, however, the impure aqueous alcohol mixture is preferably first passed into a phase separator and further diluted with water to from 20 to 60 weight percent ethanol and preferably from 30 to 45 weight percent ethanol. The temperature in the decanter can be allowed to vary from 25 to 225° F. but is preferably controlled to 75 to 150° F. Since in the preferred modification, the mutual solvent diethyl ether has been removed, a sharp separation is obtained between a major portion of the polymer oils and the aqueous alcohol layer. An oil layer comprising a further portion of the polymer oil impurities including some malodorous materials is removed from the phase separator as an upper layer. The aqueous ethanol layer, now relatively free of odor bearing impurities but containing a part of the original thermally unstable polymeric oils which tend to decompose during later distillation operations, is withdrawn as a lower layer.

This aqueous ethanol mixture is then subjected to a water extractive distillation step. The ethanol containing mixture is fed to an intermediate point of a rectification tower. Sufficient water is added at the top of the tower, or at a point above the feed plate to reduce the concentration of ethanol in the internal reflux to 5 to 40 weight percent and preferably 10 to 30 weight percent.

The water present in the extractive distillation raises the active boiling temperature on the trays and causes the passage upward in the column of volatile organic impurities remaining in the alcohol. However, certain of the remaining polymeric oils including some of the sulfur bearing types, are not sufficiently volatile to be forced upward and out of the overhead portion of the column. These higher boiling impurities are mainly of the type which are subject to degradation and decomposition during subsequent normal distillation steps when the alcohol is concentrated and separated from the major portion of water. These higher boiling, malodorous impurities generally have boiling ranges above 400° F. but under thermal conditions of fractionation, they decompose into more volatile portions boiling at or below the temperature range of ethanol. There is consequently produced as a bottoms streams an aqueous ethanol stream containing from 3 to 20 weight percent alcohol and up to 0.1 weight percent of the high boiling decomposable malodorous impurities.

For example, an aqueous bottoms stream of the following general composition has been obtained using the above outlined purification steps.

*Extractive distillation column bottoms*

| | | |
|---|---|---|
| Ethanol | weight percent | 3.0–15.0 |
| Polymer oils | weight percent | 0.002–.20 |
| Sulfur compounds | p. p. m. as sulfur | 1.0–5.0 |
| Water | | remainder |

This weak alcohol fraction is next subjected to concentration in a rectifying column. During the rectification, the high boiling polymer oil impurities accumulate in the feed zone and undergo extensive decomposition into more volatile impurities at the temperatures necessary in the column. The temperature within the column will range from about 220° F. at the base to about 175° F. at the top of the column. If the column is operated under pressure the temperatures are higher and the decomposition becomes even more severe producing correspondingly larger amounts of volatile impurities. Because of the cracking and degradation taking place, the 95% alcohol which is recovered as an overhead fraction or preferably as a top side stream from the rectifying column, is contaminated with highly malodorous, volatile materials containing sulfur usually in the combined form. These impurities can include substantial amounts of the total sulfur present in the original feed stream from the extractive distillation step. Any undecomposed heavy oils which accumulate at or near the feed plate of the rectifying column can be withdrawn from suitable side connections for further processing.

The overhead alcohol stream is still contaminated with volatile organic impurities and has an unpleasant odor which is not acceptable to the industry where very high grade alcohol is required. For highest quality alcohol, it has therefore been found necessary to pass the alcohol stream into a further stripping zone in which a controlled amount of volatile material is continuously removed as a heads fraction as an overhead stream. Thus, the malodorous 95% alcohol fraction is preferably passed directly into the upper portion of a rectifying column of 20 to 40 plates. Heat is supplied by a closed steam coil or some other suitable means whereby no further water is added to the alcohol within the column. Up to about 10% by weight of the alcohol is removed as an overhead from this heads stripping zone. It is considered necessary to remove at least 0.1% of the total feed stream in this manner in order to remove all of the volatile malodorous materials in the alcohol. The preferred minimum is about 0.5% of the total feed. Otherwise, there will be residual impurities which will impart traces of objectionable odor to the final purified alcohol product. Removal of more than about 10% is uneconomical and unnecessary to produce a refined alcohol fraction. Other critical factors for operation of the stripping column include that 100 to 600 B. t. u.'s of heat be supplied to the base of the stripping column for each pound of alcohol withdrawn as product from the base of the column. This is necessary to provide sufficient vapor upflow to distil all the malodorous sulfur bearing impurities upward against the downflowing stream of product alcohol. The bottoms stream recovered from the heads stripping column consists of highest quality refined and purified alcohol free from all malodorous materials. It shows the following typical analyses:

|  | Sample I | Sample II |
| --- | --- | --- |
| Specific Gravity | 0.8112 | 0.8110. |
| Acidity, Percent | 0.001 | 0.0018. |
| Clarity on Dilution | clear | clear. |
| Color, APHA | <5 | <5. |
| Proof | 192.3 | 192.4. |
| Methanol | <200 p. p. m. | <200 p. p. m. |
| Non-volatile matter, Percent | 0.0032 | 0.0016. |
| Permanganate Time | >60 | >60. |
| Solubility | good | good. |
| Isopropanol | <100 | <100. |
| Odor | no detectable foreign odor. | no detectable foreign odor. |

The accompanying drawing represents a schematic flow diagram of the process and shows typical apparatus for carrying out the process of this invention.

The approximate composition of the crude ethanol feed which is fed to the purification system is as follows:

7.5% ether
0.5% oil
58% alcohol
34% water

The crude feed is heated to about 200° F. in preheater 1 and fed continuously through pipe 2 to ether removal column 3, a rectifying column of approximately 40 trays, operating at approximately 15 p. s. i. g. pressure to facilitate condensing of the ether. The feed plate is preferably located at or slightly below the midpoint of the column. Heat is supplied to the base of column 3 by live steam line 4 or, alternatively, by a closed steam coil, and continuous fractional distillation of the crude ethanol feed is thereby effected. The temperature at the bottom of column 3 is maintained at about 200–220° F. Vapor boiling overhead from column 3 is removed through overhead line 5. The temperature at the top of column 3 is about 125–130° F. The vapor in line 5 is passed to total condenser 6. The condensate from condenser 6 is predominately diethyl ether with some low boiling polymer oils, aldehydes and water. This ether stream is removed via line 7. A major part of this stream is returned via line 8 to provide refluxing liquid for column 3. The remaining portion is withdrawn by line 9 as crude diethyl ether product which may be further purified and refined as desired.

A part of the polymer oil and oxygenated impurities present in the crude ethanol feed, particularly those which are more volatile than ethanol in the presence of aqueous ethanol solution, accumulate in column 3 as a non-aqueous phase at a point near and slightly above the feed point. These impurities are withdrawn from column 3 via line 10. They may be added to the bottoms stream from column 3 or they may be further processed separately. Dilute ethanol stripped of its more volatile impurities, particularly the predominant impurity diethyl ether as well as a small amount of polymer oils and other impurities, is withdrawn from the base of 3 through line 11.

Water is added to the dilute crude ethanol in line 11. This is done to adjust the ethanol concentration to approximately 35–45 weight percent. Since, under these conditions certain of the hydrocarbon oil impurities become insoluble, it is much preferred to remove this insoluble phase prior to passing the aqueous ethanol through further purification operations. Thus, the diluted mixture is passed to decanter 13 where sufficient time is allowed to permit settling. The temperature in the decanter may vary from 25 to 225° F. but is preferably controlled at about 75 to 150° F. by the operation of cooler 12. The upper layer containing oil impurities, and other organic materials, as well as some dissolved alcohol, are removed as the upper layer by line 14. The aqueous lower layer from decanter 13 containing essentially all of the ethanol is withdrawn through line 15 and is passed to pump 16 which discharges through line 17 to extractive distillation column 18. This column is preferably a distillation tower of about 45 plates and feed line 17 is positioned at or slightly above the midpoint. Dilution water is introduced into column 18 via line 19 at a point above the feed point, either at or near the top. Continuous extractive distillation is conducted in column 18. The water is introduced in such amounts to effect dilution and to modify and increase the volatilities of the organic compounds, particularly the remaining polymer oil impurities such that they can be readily removed from the alcohol by distillation. This water may be pure water or it can be an aqueous stream which is recycled from the bottom of the alcohol rectification column.

The feed to column 18 is preferably preheated prior to introduction to a temperature at or near that of the internal liquid reflux under equilibrium conditions of the tray located at the introduction position. The column is operated with continuous introduction of alcohol feed, continuous introduction of water above the feed, and with sufficient heat provided to effect distillation throughout the column. The amount of water added is sufficient to reduce the ethanol concentration to 5 to 40 weight percent, and preferably 10 to 30 weight percent in the internal liquid reflux. Operating thus, the purified aqueous ethanol fraction recovered as the bottoms stream is dissolved in and carried downward in the aqueous internal reflux. Steam is introduced into the base of column 18 through line 20, or alternatively, heat may be supplied to column 18 by means of a closed heating coil. Overhead vapors boiling from column 18 are carried by line 21 to condenser 22.

The remainder of the lighter oil impurities together with the aqueous ethanol vapors which distil from column 18 are removed in the overhead stream via line 21 and passed to condenser 22. The resulting condensate is then passed to decanter 24. By using sufficient dilution water, in column 18, the oil impurities distilled from column 18 form an upper oil phase in decanter 24 and are withdrawn through line 25 for further treatment. The lower aqueous phase from decanter 24 is returned to column 18 as reflux through line 26 or, alternatively, may be partially or totally withdrawn through line 27 as an overhead aqueous stream to remove any water soluble impurities present.

Bottoms product stream from column 18 containing the predominant part of the original ethanol in dilute aqueous solution of about 3 to 20 weight percent of ethanol and essentially free of all of its original impurities with the exception of a small amount of the heavy hydrocarbon oils is withdrawn via line 28. From line 28 it is passed to pump 29 discharging through line 30 to rectifying column 31 having 60 to 70 trays. Heat is supplied to the base of column 31 through steam line 32 or, alternatively, it can be supplied through a closed heating coil. In column 31, the purified aqueous alcohol is concentrated to the required strength. Vapors boiling overhead from 31 which consist of partially refined ethanol but containing volatile malodorous decomposition products formed in column 31 by decomposition of the heavier oil impurities are passed by line 33 to condenser 34. The top temperature of rectifying column 31 is about 175° F. A condensed ethanol fraction is withdrawn from condenser 34 through line 35. A part is returned to the top of column 31 through line 36 to provide reflux. The partially refined alcohol fraction is withdrawn through line 37 and passed into the upper portion of rectifying column 41 for final purification.

Any heavy oils which may accumulate near the feed tray of column 31 are withdrawn from above and below the feed plate through side connections 38 and pipe 40 for further processing. Water substantially free of alcohol is withdrawn from the base of column 31 through line 39.

This aqueous bottoms stream may, if desired, be partially or totally recycled to extractive distillation column 18 and added via line 19.

Heat is supplied to the base of column 41 by means of a closed steam coil 50, which discharges vapors through line 48 into column 41. The volatile decomposition products which enter column 41 with the alcohol feed pass upward through the column and are removed overhead as vapor stream 42. About 0.5 to 5.0 weight percent of the ethanol feed stream is removed as this overhead vapor stream. These impurities, together with ethanol, are condensed in condenser 43. The condensed alcohol impurities stream is withdrawn from condenser 43 via line 44. A part of the condensate is returned as reflux to column 41 via line 46 and a part is withdrawn from the system via lines 45 and 52. If desired, the alcohol in this stream may be recovered in any suitable fashion. This volatile impurities stream can also be recycled to the top section of extractive distillation column 18 via line 51 for recovery of the alcohol contained therein and removal of impurities through purge line 27. Highly refined ethanol, free of both lower and higher boiling impurities, and having no malodorous contaminants, is recovered from the bottom of column 41 by line 47. A part is recycled through closed steam coil 50 to provide heat for column 41, and the remainder is withdrawn via line 49 as highly refined product alcohol.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. In a method for purifying and refining crude aqueous ethanol produced by the hydration of ethylene, said crude ethanol containing lower boiling impurities, including diethyl ether, and higher boiling impurities, including malodorous organic impurities boiling both above and below ethanol, and unstable polymeric oils which undergo decomposition under normal distillation conditions, which comprises the steps of continuously passing said crude aqueous ethanol into a fractional extractive distillation zone, continuously feeding water into said fractional extractive distillation zone at a point above the aqueous ethanol feed stream, maintaining an internal liquid reflux having an ethanol content of 5 to 40 weight percent within the zone below the water feed point, continuously removing from the upper portion of said extractive distillation zone, a stream containing organic impurities including both lower and higher boiling materials, continuously removing from the lower portion of said extractive distillation zone a dilute aqueous ethanol stream, passing said aqueous ethanol stream to a concentrating, fractional distillation zone, and removing from an upper portion of said concentrating distillation zone a stream of partially purified ethanol, the improvement which comprises the steps in combination of initially passing said crude aqueous ethanol into a fractional distillation zone, removing from the upper portion of said zone a stream containing lower boiling impurities including substantially all of the diethyl ether, removing from the lower portion of said zone a liquid aqueous ethanol stream, continuously passing the ether-free aqueous ethanol stream into a phase separation zone wherein phase separation takes place, separating a non-aqueous upper layer containing a major portion of the organic malodorous impurities, separating an aqueous ethanol lower layer, continuously passing said aqueous ethanol stream into the above described fractional extractive distillation zone, after removal from the above described concentrating fractional distillation zone of a stream of partially purified ethanol, subsequently passing said stream of partially purified ethanol into a stripping fractionation zone, continuously removing from an upper portion of said stripping fractionation zone at least 0.5 weight percent and not more than 10 weight percent of said feed stream including essentially all of the volatile impurities and including all of the malodorous impurities, and removing from the lower portion of said stripping fractionation zone, a stream of purified odor-free ethanol.

2. In a method for purifying and refining crude aqueous ethanol produced by the hydration of ethylene, said crude ethanol containing lower boiling impurities, including diethyl ether, and higher boiling impurities, including malodorous organic impurities boiling both above and below ethanol, and unstable polymeric oils which undergo decomposition under normal distillation conditions, which comprises the steps of continuously passing said crude aqueous ethanol into a fractional extractive distillation zone, continuously feeding water into said fractional extractive distillation zone at a point above the aqueous ethanol feed stream, maintaining an internal liquid reflux having an ethanol content of 5 to 40 weight percent within the zone below the water feed point, continuously removing from the upper portion of said extractive distillation zone, a stream containing organic impurities including both lower and higher boiling materials, continuously removing from the lower portion of said extractive distillation zone a dilute aqueous ethanol stream, passing said aqueous ethanol stream to a concentrating fractional distillation zone, and removing from an upper portion of said concentrating distillation zone a stream of partially purified ethanol, the improvement which comprises the steps in combination of initially passing said crude aqueous ethanol into a fractional distillation zone, removing from the upper portion of said zone a stream containing lower boiling impurities including substantially all of the diethyl ether, removing from the lower portion of said zone a liquid aqueous ethanol stream, continuously passing the ether-free aqueous ethanol stream into the above described fractional extractive distillation zone and then to said concentrating fractional distillation zone, removing from said concentrating fractional distillation zone a stream of partially purified ethanol, subsequently passing said stream of partially purified ethanol into a stripping fractionation zone, continuously removing from an upper portion of said stripping fractionation zone at least 0.1 weight percent and not more than 10 weight percent of said feed stream including essentially all of the volatile impurities and including all of the malodorous impurities, and removing from the lower portion of said stripping fractionation zone, a stream of purified odor-free ethanol.

References Cited in the file of this patent

UNITED STATES PATENTS

| | | |
|---|---|---|
| 2,552,412 | Drout et al. | May 8, 1951 |
| 2,610,141 | Drout | Sept. 9, 1952 |
| 2,635,992 | Carlson et al. | Apr. 21, 1953 |
| 2,638,440 | Drout et al. | May 12, 1953 |
| 2,663,679 | Drout | Dec. 22, 1953 |